United States Patent
Chen

(10) Patent No.: US 6,349,223 B1
(45) Date of Patent: Feb. 19, 2002

(54) UNIVERSAL HAND-FREE SYSTEM FOR CELLULAR PHONES IN COMBINATION WITH VEHICLE'S AUDIO STEREO SYSTEM

(75) Inventor: Tonny Chen, Chang-Hua (TW)

(73) Assignee: E. Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 09/263,865

(22) Filed: Mar. 8, 1999

(51) Int. Cl.[7] .............................. H04B 1/38; H04M 1/00
(52) U.S. Cl. ...................... 455/569; 455/99; 455/345; 455/174; 455/74 R
(58) Field of Search .................. 455/569, 99, 345, 455/350; 379/420; 174/74 R

(56) References Cited

U.S. PATENT DOCUMENTS 5,243,640 A * 9/1993 Hadley ........................ 379/59
5,841,856 A * 11/1998 Ide ............................... 379/406
6,078,825 A * 6/2000 Hahn ........................... 455/569
6,138,041 A * 10/2000 Yahia ........................... 455/569

* cited by examiner

Primary Examiner—Vivian Chang
Assistant Examiner—James K. Moore
(74) Attorney, Agent, or Firm—Rosenberg, Klein & Lee

(57) ABSTRACT

A universal hand-free system for use with various types of cellular phones produced by different manufacturers is designed to operate in combination with a vehicle's audio stereo system. The hand-free system can automatically turn off a vehicle's audio stereo system when incoming signals are being received by a cellular phone and automatically turn on the audio stereo system as the cellular phone terminates its operation. It intends to improve the communication quality of a cellular phone and increase driving safety. Moreover, by means of signal cable, which can convert and discern incoming signals and signal criterion levels for various types of cellular phones produced by different manufacturers, the hand-free system can be universally applied to a variety of cellular phones.

4 Claims, 8 Drawing Sheets

UNIVERSAL HAND-FREE SYSTEM FOR CELLULAR PHONES IN COMBINATION WITH VEHICLE'S AUDIO STEREO SYSTEM

BACKGROUND OF THE INVENTION

The present invention relates to a universal hand-free system for use with various types of cellular phones produced by different manufacturers. Such a hand-free system can automatically turn off a vehicle's audio stereo system when incoming signals are being received by a cellular phone and automatically turn on the audio stereo system as the cellular phone terminates its operation, making communication quality of a cellular phone improved and driving safety increased. Moreover, by means of a signal cable, which can convert and discern incoming signals and signal criterion levels for various types of cellular phones produced by different manufacturers, the hand-free system of the present invention can be universally applied to a variety of cellular phones.

Deregulation of local communication business as well as the opening of domestic cellular phone markets results in multiple times increase in users of cellular phones. Under such a circumstance, consumers in the cellular phone markets require the functional advance of cellular phones more and more. Related peripheral equipment of cellular phones has been developed at a fast pace. In particular, hand-free systems for use with vehicles are the most prospective items. However, because new types of cellular phones are marketed at a fast pace, it is very common for members of a family to have a number of cellular phones of various types made by different makers. So, the hand-free system for use with one specific type of cellular phone is out of date now.

The inventor has noticed this kind of problem and has come up with a universal hand-free system for use with a plurality of types of cellular phones. For cellular phones produced by different makers or various types of cellular phones made by the same maker, the working voltages, the charging voltages, the volume of the output voice, and the pin holes of the output signal socket of the cellular phones are mostly different. Simple replacement of signal cables cannot solve the problem. Referring to FIG. 1, a prior art hand-free system 1 applicable to various types of cellular phones is provided with a signal cable 12. The cable has a plug connector 121 which is equipped with a plug embodiment 122 having a plurality of plug pins in conformance to the pin holes of a specific type of cellular phone. So, different types of cellular phones can be adapted to the prior art hand-free system of FIG. 1 by replacement of signal cable 12. Such an approach can be only applied to a particular type of cellular phone having a fixed configuration. It cannot be universally applied to all cellular phones.

SUMMARY OF THE INVENTION

Therefore, the primary object of the present invention is to provide a universal hand-free system in combination with a vehicle's audio stereo system for use with various types of cellular phones. It mainly has an acoustic source control CPU, which can definitely discern various incoming signals of cellular phones of different brands and, incoming signals of a cellular phone can be automatically converted and output via speakers of a vehicle's audio stereo system by means of associated circuits, making the use of cellular phones safer and easier.

DETAILED DESCRIPTION OF THE PREFERRED EMBODIMENTS

Figure 1:
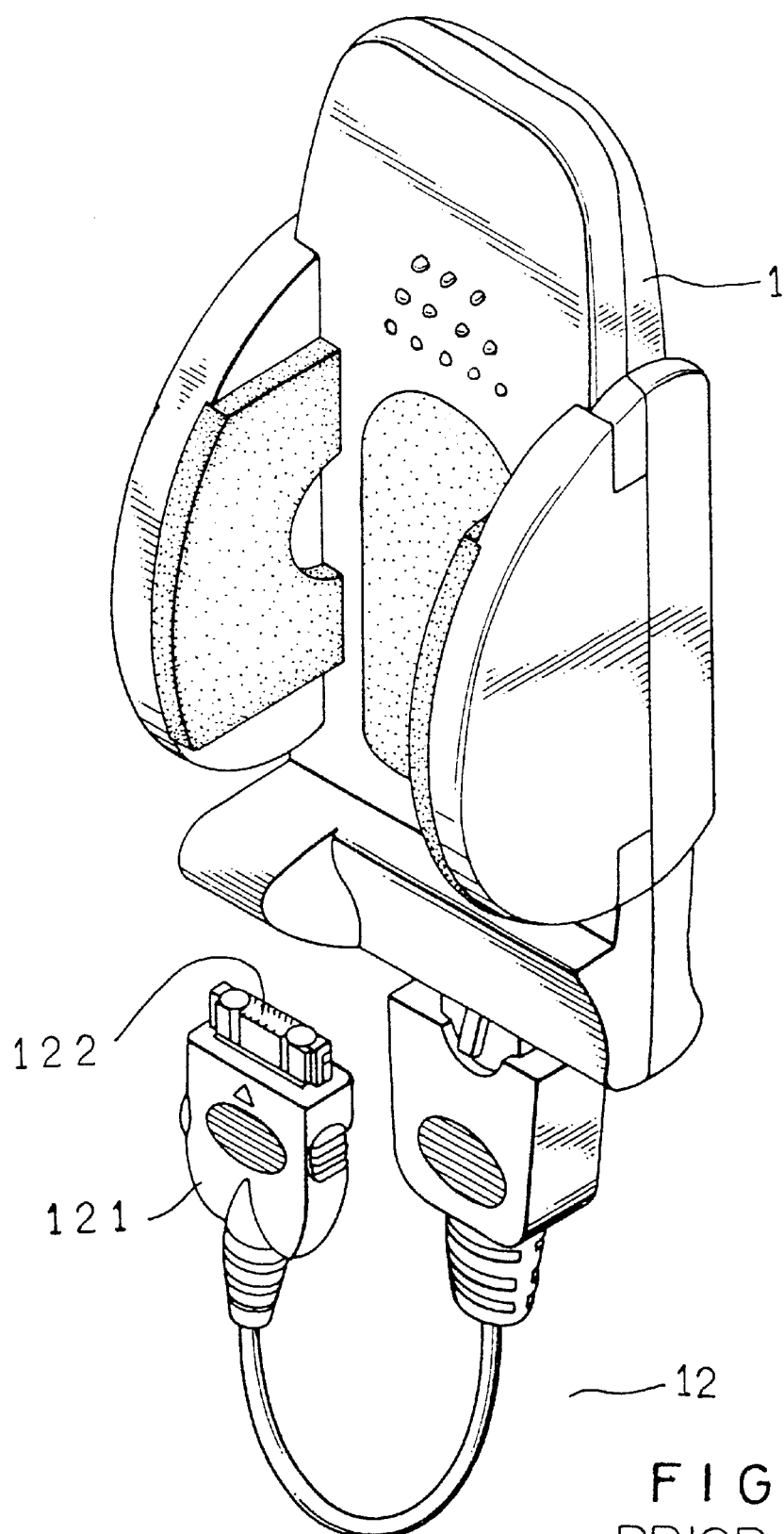
FIG. 1 is a diagram showing a prior art hand-free system for a cellular phone.
Figure 2:
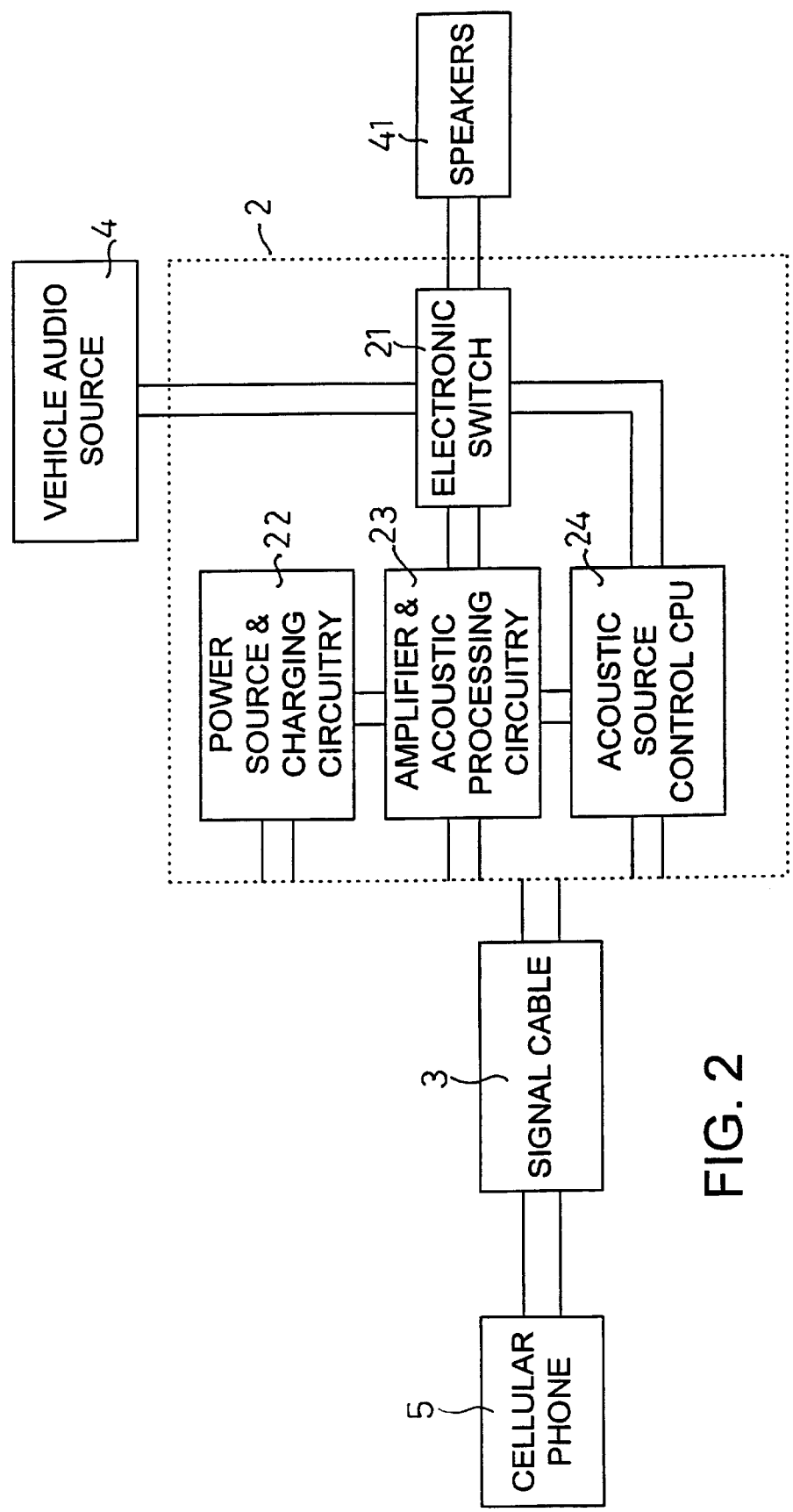
FIG. 2 is a diagram showing the arrangement of the present invention in association with a vehicle's audio stereo system and a cellular phone.

Referring to FIG. 2, the present invention is coupled to a vehicle's audio stereo system. The present universal hand-free system for use with a variety of cellular phones is operated in combination with a vehicle's audio stereo system. It mainly comprises a hands-free unit 2 including an electronic switch 21, a power source and charging circuitry 22, an amplifier and acoustic quality processing circuitry 23, and an acoustic source control CPU 24. The hands-free unit 2 works in connection to a signal cable 3 coupled to a cellular phone 5.

The electronic switch 21 is activated by the acoustic source control CPU 24 to control the acoustic source of speakers 41 of the vehicle's audio stereo system 4 to be either from said vehicle's audio stereo system 4 or from a cellular phone 5. It can automatically turn off the vehicle's audio stereo system 4 when said cellular phone 5 is in an operational or receiving state and can automatically turn on the audio stereo system 4 upon the cellular phone 5 being cut off.

The power source and charging circuitry 22 supplies proper electric power and charging current to the cellular phone 5, permitting a chargeable battery to be recharged at any time.

The amplifier and acoustic quality processing circuitry 23 amplifies incoming signals of the cellular phone 5 for consecutive acoustic output and eliminates crosstalk and echo in signal transmission, improving the acoustic quality of the cellular phone by increasing acoustic fidelity in communication.

Figure 3:
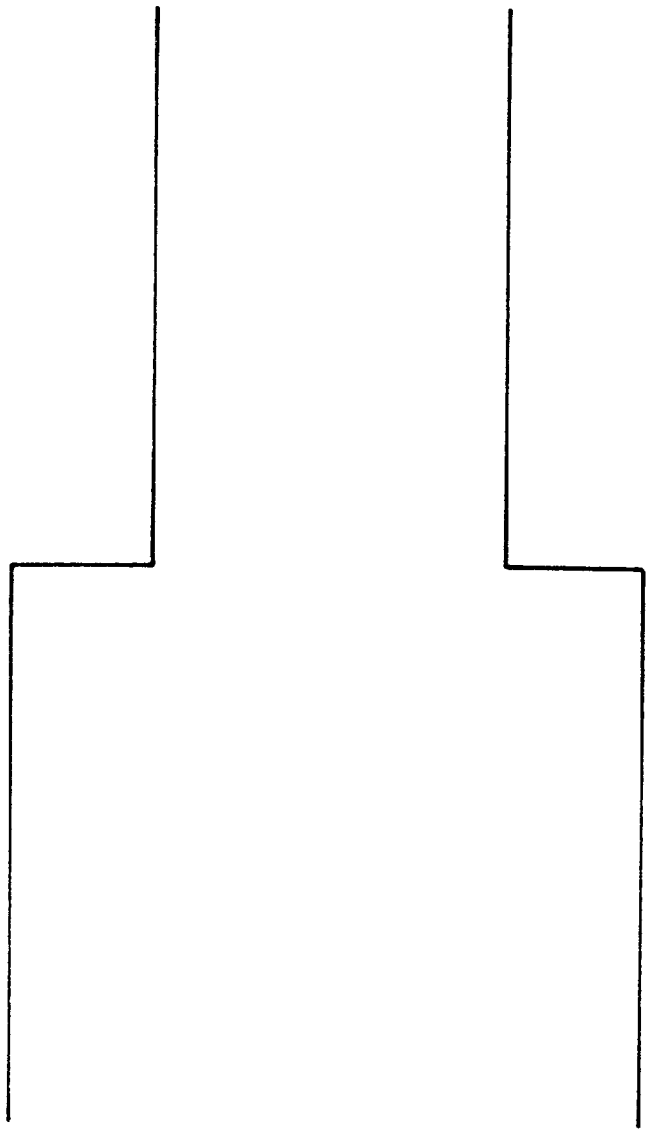
FIG. 3 is a diagram showing the first type of signal criterion level of a standby and incoming signal of a cellular phone.
Figure 4:
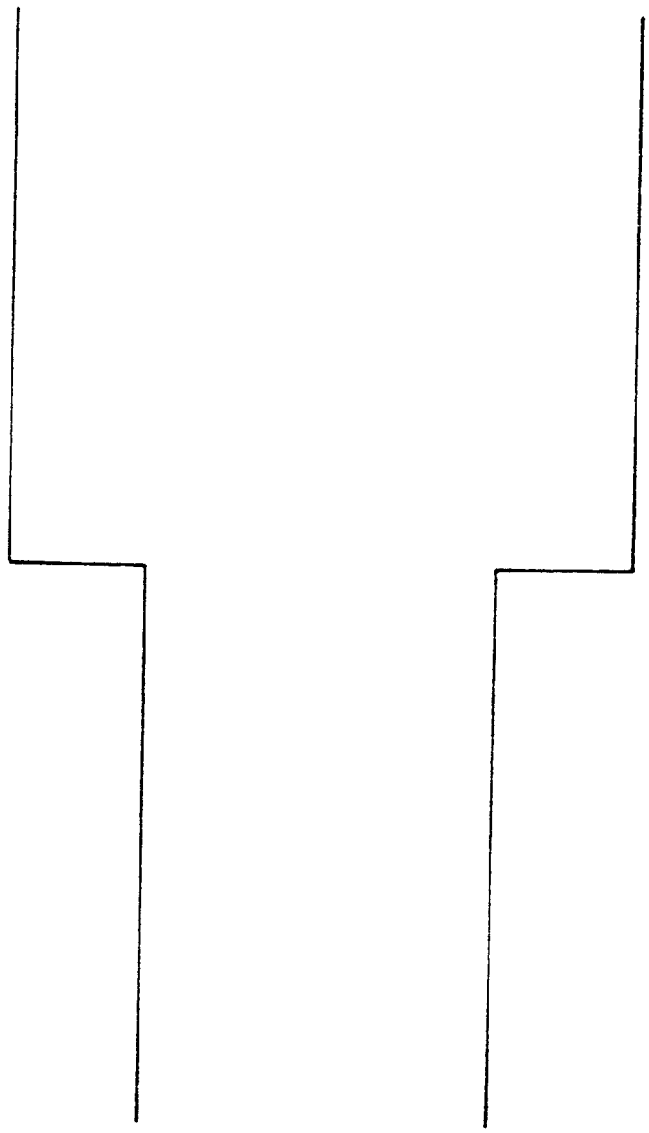
FIG. 4 is a diagram showing the second type of signal criterion level of a standby and incoming signal of a cellular phone.
Figure 5:
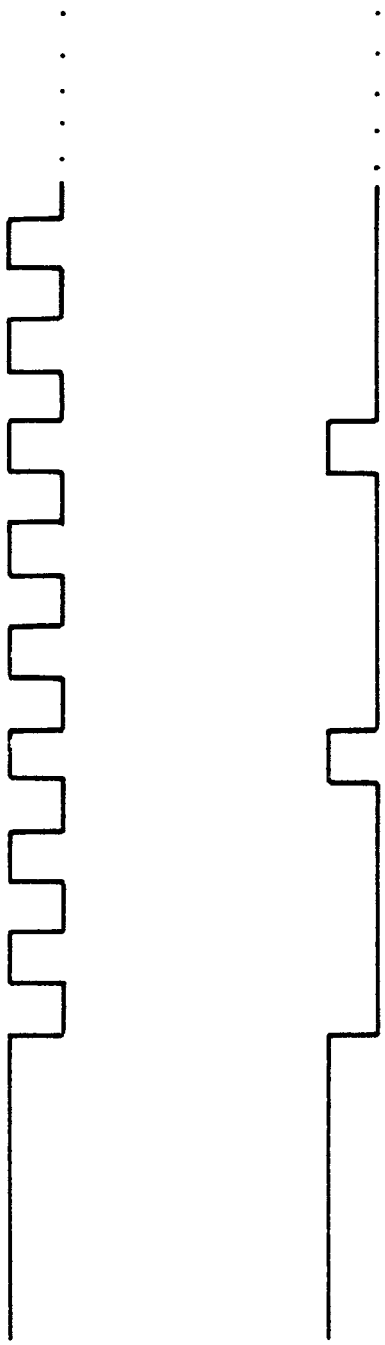
FIG. 5 is a diagram showing the third type of signal criterion level of a standby and incoming signal of a cellular phone.

As the signal cable 3 is hooked up between a cellular phone 5 and a hand-free embodiment 2 of the hand-free system, signal voltages are permitted to be transmitted from the cellular phone 5 to the acoustic source control CPU 24. Signals, regardless of having high HI (A1), low LO (A2) or serial-pulse wave form (A3), as shown in FIGS. 3, 4, and 5, all are set to have an initial value (i.e., a standby value). As a cellular phone outputs signals (i.e., on variation of standby signals), the signal voltages are changed into their reverse phase respectively, as shown in FIGS. 3, 4, and 5). Accordingly, signal HI (A1) is changed into LO (B 1) and LO (A2) into HI (B2) or serial-pulse wave form into LO or HI as a result of conversion by a CPU circuitry in the signal cable. Accordingly, the electronic switch 21 is activated by a signal from the acoustic source control CPU 24 to simultaneously transmit incoming acoustic voices of the cellular phone 5 to the speakers 41 of the vehicle's audio stereo system for output and turn-off the audio stereo system 4.

Figure 6:
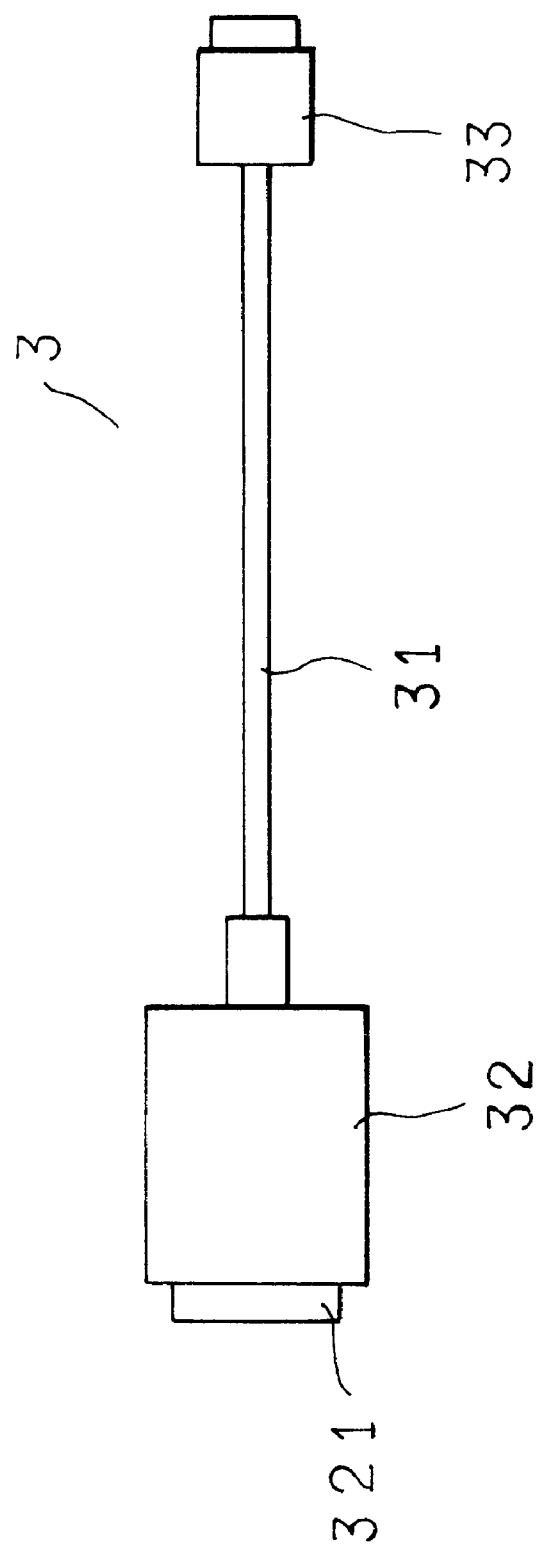
FIG. 6 is a diagram showing the signal cable of the present invention.

The signal cable 3 having a flexible cable embodiment 31 of proper length, as shown in FIG. 6, has a first plug connector 32 at one end in registration with a signal output socket of the cellular phone for connection purposes. The frontmost terminal of the first plug connector 32 is provided with a conducting means 321 engaged with the output pin holes of the signal output socket of the cellular phone 5. The conducting means 321 may have different arrangements of its plug pins in conformance to the pin holes of the signal output socket of various cellular phones 5. At the other end of the cable connector is a second plug connector 33 for registration with a hand-free embodiment 2 of the hand-free system. Moreover, in the first plug connector 32 in conformance to voltage criterion level circuitry of the cellular phone 5, a voltage division resistor in correspondence to the power source and charging circuitry 22 is disposed to obtain a proper power supply and charging current for the cellular phone 5. In correspondence to acoustic voice criterion level circuitry of the cellular phone 5, one or one set of voltage division resistors or capacitors, which can adjust the voltage of input voices, is associated with the amplifier and acoustic quality processing circuitry 23 to obtain a proper voice input value. The capacitance of the capacitors (or resistance of the resistors) can be varied between zero and infinity.

Furthermore, for those types of cellular phones having no distinctive variations in HI, LO signals, the first plug connector of the signal cable 3 is provided with a CPU circuitry which can discern serial-pulse wave signals and replace the same signals with common simple high or low voltage signals. The converted signals are used for consecutive terminal signal discernment.

Figure 7:
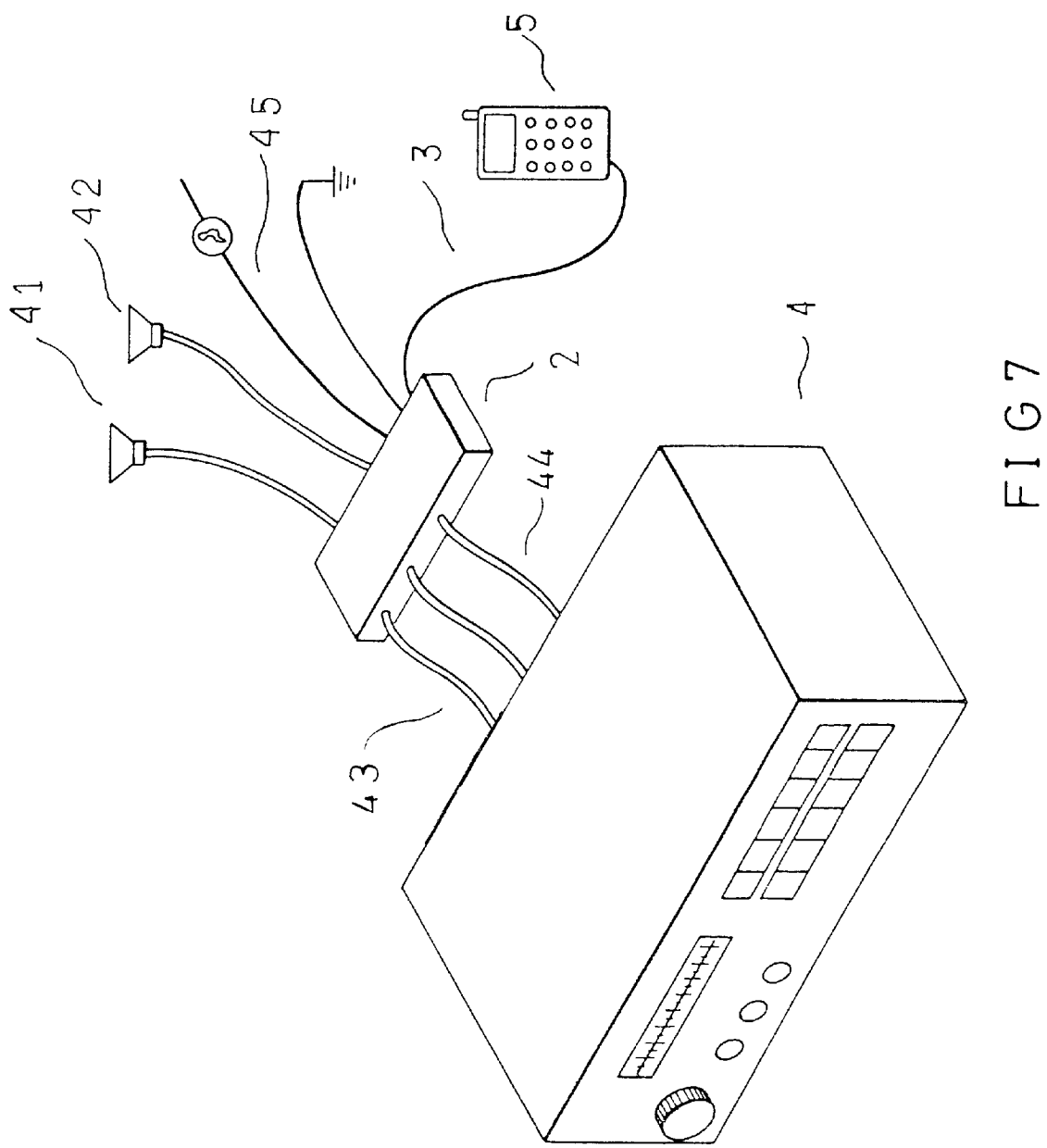
FIG. 7 is a diagram showing an embodiment of the present invention.

Referring to FIG. 7, the hand-free system of the present invention operates in combination with a vehicle's audio stereo system 4. In practical use, the hand-free embodiment 2 of the hand-free system is placed between the voice output terminal 43 and the speakers 41, 42 of the audio stereo system 4, and also between the power supply terminal 44 of the vehicle's audio stereo system 4 and the power supply source 45. To avoid installation problems, FIGS. 3, 4, 5 are referenced. The installation and structure of the system are not major concerns of the present invention, and so the details are not disclosed.

As shown in FIGS. 3, 4, and 5, the standby status A and operation status B of general cellular phones are classified into 3 types. The first and second types of voltage variations between a standby status and operation status are from high (A1) to low (B1) or from low (A2) to high (B2) respectively. In case of the third type of a signal voltage in a serial-pulse waveform, the variation between the standby status A3 and operation status B3 is simply the difference in the frequency of the serial pulse per unit time. Under such a circumstance, a CPU circuitry is disposed in the signal cable 3 for the purpose of discernment of the signals. As a wave form of a standby status is detected, the CPU circuitry will deliver a LO or HI signal for replacement of the serial-pulse wave form. In case of a wave form of an operation status is detected, CPU circuitry will transmit a HI or LO signal as a substitute.

So, as the first plug connector 32 of the signal cable 3 is registered with the signal output socket of a cellular phone 5, the signals input into the acoustic source control CPU 24 are all treated as an initial value (i.e., a standby value), regardless of the signals being high, or low, simple voltage wave forms (the serial-pulse wave form being converted into simple high or low voltage by the CPU circuitry in the signal cable). In case that the incoming signals input to the acoustic source control CPU from the signal terminal of the cellular phone 5 are converted from high to low or low to high in voltage, the cellular phone 5 is regarded as in a receiving or operation status. Then the acoustic source control CPU sends off a signal to control the electronic switch 21 to turn the audio stereo system for mute or cut off the power supply to the audio stereo system, and to connect the input terminal of speakers 41 to the hand-free embodiment 2. Thereby after the incoming voice signal of the cellular phone 5 is adjusted by the amplifier and acoustic quality processing circuitry 23 to increase its fidelity, the electronic switch 21 is actuated to make the voice broadcast via the speakers 41. When the cellular phone 5 is not in use, the standby signal of the cellular phone 5 resumes an initial value. Then, the acoustic source control CPU 24 dispatches a control signal to the electronic switch 21 to return the acoustic source to the vehicle's audio stereo system 4 from the amplifier and acoustic quality processing circuitry 23.

Figure 8:
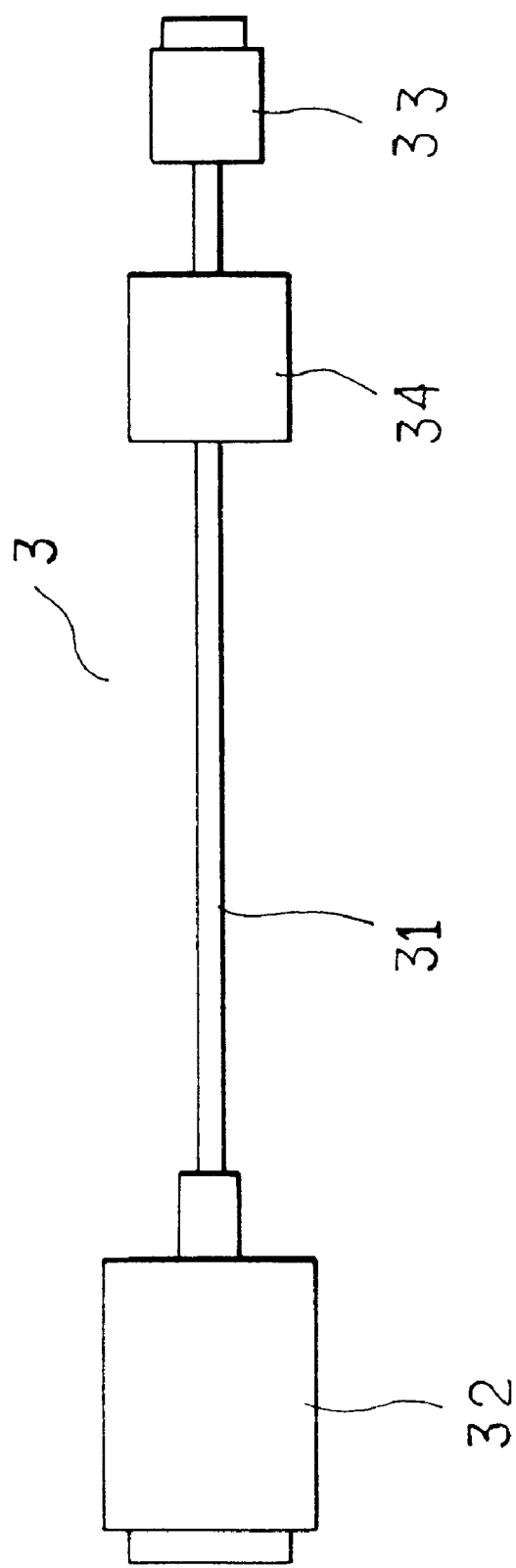
FIG. 8 is a diagram showing another type of signal cable of the present invention.

Referring to FIG. 8, the component required in the signal cable (resistors, capacitors, or CPU circuitry) can be solely housed in the second plug connector 33 or can be disposed in a box 34 which is placed between the first and second plug connectors 32, 33.

In summary, the present invention has a simple structure and can use circuitry (resistors, capacitors, or CPU circuitry) in the signal cable to carry out the discerning of signals by means of the acoustic source control CPU, and the problems of standby status of all types of cellular phones of different brands and the discernment of voltage criterion levels of incoming signals can be effectively solved. By means of the hand-free embodiment, cellular phones can be used in vehicles to effectively advance the quality, the safety, and the facility of communication.

I claim:

1. A universal hands-free system for operably interconnecting a cellular telephone selected from a plurality of types to a vehicle audio system speaker for the audible reproduction thereby of a received cellular telephone signal comprising:

(a) a hands-free unit including:
(1) first circuitry for amplifying and acoustically processing the received cellular telephone signal;
(2) second circuitry operably coupled to said first circuitry for powering and charging the cellular telephone;
(3) an acoustic source controller coupled to said first circuitry for automatically monitoring the received cellular telephone signal for a transition thereof between a standby and an operational state, said acoustic source controller generating and maintaining a transition signal upon detection of said cellular telephone signal transition to the operational state; and,
(4) an electronic switch coupled to said first circuitry and said acoustic source controller for selectively connecting to and disconnecting from the vehicle audio system speaker said first circuitry responsive to the detection by said acoustic source controller of said transition, said electronic switch connecting said first circuitry to the vehicle audio system responsive to said transition signal; and, (b) a signal cable coupled to said hands-free unit for interconnecting the selected cellular telephone thereto, said signal cable including a pair of plug connectors, one of said pair of plug connectors having an impedance control portion including at least one of a voltage division resistor or a voltage division capacitor having a predetermined value corresponding to signal levels of the selected cellular telephone;

whereby an amplified and acoustically processed form of the received cellular telephone signal is audibly reproduced by the vehicle audio system speaker during the operational state of the cellular telephone.

2. A universal hands-free system for operably interconnecting a cellular telephone selected from a plurality of types to a vehicle audio system speaker for the audible reproduction thereby of a received cellular telephone signal comprising:

(a) a hands-free unit including:
   (1) first circuitry for amplifying and acoustically processing the received cellular telephone signal;
   (2) second circuitry operably coupled to said first circuitry for powering and charging the cellular telephone;
   (3) an acoustic source controller coupled to said first circuitry for automatically monitoring the received cellular telephone signal for a transition thereof between a standby and an operational state, said acoustic source controller generating and maintaining a transition signal upon detection of said cellular telephone signal transition to the operational state; and,
   (4) an electronic switch coupled to said first circuitry and said acoustic source controller for selectively connecting to and disconnecting from the vehicle audio system speaker said first circuitry responsive to the detection by said acoustic source controller of said transition, said electronic switch connecting said first circuitry to the vehicle audio system responsive to said transition signal; and,
(b) a signal cable coupled to said hands-free unit for interconnecting the selected cellular telephone thereto, said signal cable including:
   (1) a first plug connector configured for releasable connection to an output socket of the selected cellular telephone, said first plug having an impedance control portion including at least one of a voltage division resistor or a voltage division capacitor having a predetermined value corresponding to signal levels of the selected cellular telephone;
   (2) a second plug connector releasably connected to said hands-free unit; and,
   (3) a flexible conductive portion extending between said first and second plugs;

whereby an amplified and acoustically processed form of the received cellular telephone signal is audibly reproduced by the vehicle audio system speaker during the operational state of the cellular telephone.

3. A universal hands-free system for operably interconnecting a cellular telephone selected from a plurality of types to a vehicle audio system speaker for the audible reproduction thereby of a received cellular telephone signal comprising:

(a) a hands-free unit including:
   (1) first circuitry for amplifying and acoustically processing the received cellular telephone signal;
   (2) second circuitry operably coupled to said first circuitry for powering and charging the cellular telephone;
   (3) an acoustic source controller coupled to said first circuitry for automatically monitoring the received cellular telephone signal for a transition thereof between a standby and an operational state, said acoustic source controller generating and maintaining a transition signal upon detection of said cellular telephone signal transition to the operational state; and,
   (4) an electronic switch coupled to said first circuitry and said acoustic source controller for selectively connecting to and disconnecting from the vehicle audio system speaker said first circuitry responsive to the detection by said acoustic source controller of said transition, said electronic switch connecting said first circuitry to the vehicle audio system responsive to said transition signal; and,
(b) a signal cable coupled to said hands-free unit for interconnecting the selected cellular telephone thereto, said signal cable including:
   (1) a first plug connector configured for releasable connection to an output socket of the selected cellular telephone;
   (2) a second plug connector releasably connected to said hands-free unit;
   (3) a flexible conductive portion extending between said first and second plugs; and,
   (4) a box coupled to said flexible conductive portion between said first and second plugs, said box housing an impedance control portion including at least one of a voltage division resistor or a voltage division capacitor having a predetermined value corresponding to signal levels of the selected cellular telephone;

whereby an amplified and acoustically processed form of the received cellular telephone signal is audibly reproduced by the vehicle audio system speaker during the operational state of the cellular telephone.

4. A universal hands-free system for operably interconnecting a cellular telephone selected from a plurality of types to a vehicle audio system speaker for the audible reproduction thereby of a received cellular telephone signal comprising:

(a) a hands-free unit including:
   (1) first circuitry for amplifying and acoustically processing the received cellular telephone signal;
   (2) second circuitry operably coupled to said first circuitry for powering and charging the cellular telephone; and,
   (3) an electronic switch coupled to said first circuitry for selectively connecting to and disconnecting from the vehicle audio system speaker said first circuitry; and,
(b) a signal cable coupled to said hands-free unit for interconnecting the selected cellular telephone thereto, said signal cable including:
   (1) a first plug connector configured for releasable connection to an output socket of the selected cellular telephone;
   (2) a second plug connector releasably connected to said hands-free unit; and,
   (3) a flexible conductive portion extending between said first and second plugs; and,
   (4) a box coupled to said flexible conductive portion between said first and second plugs, said box housing an impedance control portion including at least one of a resistive voltage divider circuit and a capacitance circuit and an acoustic source controller, said acoustic source controller being coupled to said first circuitry and said electronic switch for automatically monitoring the received cellular telephone signal for a transition thereof between a standby and an operational state, said acoustic source controller generating and maintaining a transition signal upon detection of said cellular telephone signal transition to the operational state, said transition signal actuating said electronic switch to responsively connect said first circuitry to the vehicle audio system;

whereby an amplified and acoustically processed form of the received cellular telephone signal is audibly reproduced by the vehicle audio system speaker during the operational state of the cellular telephone.

* * * * *